March 18, 1930. N. M. BAKER 1,751,024
GOGGLES
Filed April 11, 1927

Inventor
Nelson M. Baker.
By Harry H. Styll.
Attorney

Patented Mar. 18, 1930

1,751,024

UNITED STATES PATENT OFFICE

NELSON M. BAKER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS

GOGGLES

Application filed April 11, 1927. Serial No. 182,770.

This invention relates to goggles and has particular reference to means whereby the lenses of goggles may be quickly replaced or interchanged.

The principal object of the invention is to provide means whereby lenses may be quickly positioned in or removed from the eye cups of goggles.

Another object of the invention is to provide goggles having eye cups constructed in conjunction with lens retaining clips to facilitate the replacement or interchangement of lenses.

Another object is to provide simple, durable and efficacious means well adapted for the purpose for which it is designed.

Other objects and advantages will be apparent by reference to the following description taken in connection with the accompanying drawings, and it will be understood that I may make many modifications in the specific details of construction shown and described within the scope of the appended claims without departing from or exceeding the spirit of the invention, the preferred forms only have been shown and described by way of illustration.

Referring to the drawings.

Figures 1, 2, 3, 4:
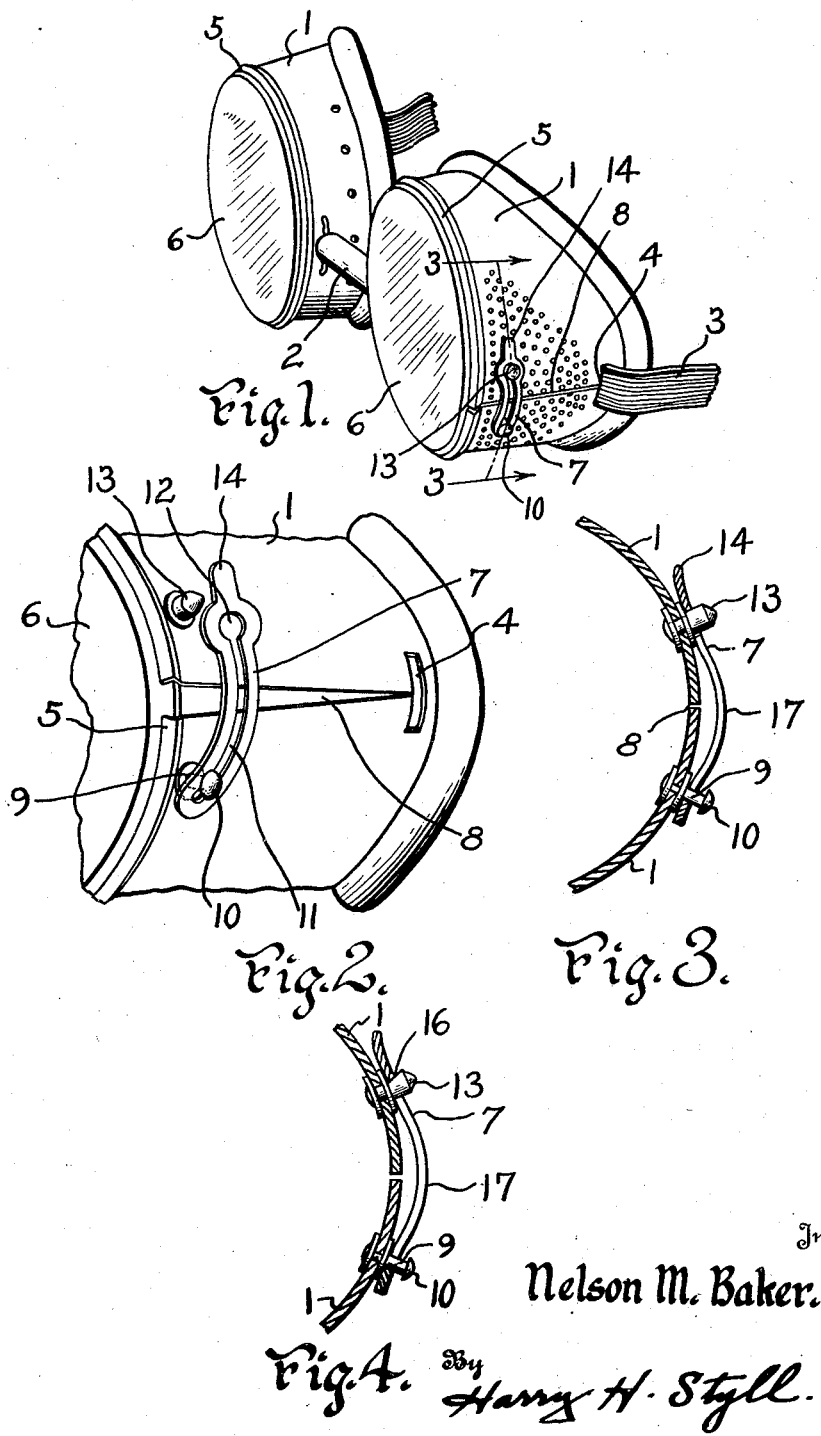
Fig. 1 is a perspective view of the goggle embodying the invention.
Fig. 2 is a fragmentary perspective view showing the eye cup opened.
Fig. 3 is a fragmentary sectional view taken on line 3—3 of Fig. 1.
Fig. 4 is a view similar to Fig. 3 showing a modification.

This goggle is designed for protection from relatively large flying particles such as from the scaling and grinding of metals, stone dressing, wood turning, etc., and from smaller particles such as grit, dust, soot, etc.

Lenses contained in goggles of this character soon become broken or scratched from flying particles so as to affect the vision of the wearer and thereby require replacement or interchangement.

The lenses in most prior art goggles of this character were rigidly positioned in the eye cups during the formation of the goggle and no means were provided for the necessary replacement or interchangement of lenses and thereby formed a very costly and undesirable goggle.

The present invention is therefore designed to eliminate this undesired feature and save a great amount of time and labor by providing means whereby the lenses may be quickly interchanged or replaced.

Referring more particularly to the drawings the invention consists of a goggle formed of the eye cups 1 connected at the center by the bridge or nose contacting member 2 and held upon the face of the wearer by the elastic head band or the like 3 which is anchored at each end in the slots 4 formed in the side walls of the eye cups.

The eye cups 1 may be made of aluminum or any suitable material and are provided with the lens grooves 5 in which the lenses 6 are seated and are held therein by the lens retaining clips or the like 7.

The walls of the eye cups 1 are provided with the slits 8, which extend from the lens grooves 5 to the slots 4 to allow the eye cups to be expanded so that the lenses 6 may be quickly replaced or interchanged.

A suitable pin or stud 9 having the enlarged head 10 is positioned on one side of the slit 8 and is adapted to loosely and slidingly support one end of the clip member 7 which is provided with the longitudinal slot 11. The slot 11 terminates in the enlarged recessed end 12 which is adapted to engage with and be sprung over the cone tipped stud 13. The stud 13 is positioned on the opposite side of the slit 8 so that the slit 8 will be drawn together by the clip 7 to hold the lens 6 within the eye cup. The enlarged end 12 is formed with the lip 14 so that the clip may be easily slipped off the stud 13 to allow the eye cup to be opened for the removal or replacement of the lens.

Fig. 4 shows a slight modification in which the stud 13 is provided with the notched face 16 so that the clip 7 will not accidently slip off the stud during the use of the goggle.

The clip 7 is preferably formed of spring steel and is arched in the center as at 17, Figures 3 and 4, so that when it is sprung over the stud 13 there will be a gripping action having a tendency to continually urge the walls of the eye cups together to rigidly hold the lens within the goggle.

From the foregoing it will be seen that I have provided a goggle having simple, durable and efficacious means whereby lenses may be quickly replaced or interchanged.

Having described my invention, I claim:

1. In a device of the character described, a split eye cup having means to engage a lens, a resilient clip having a slot intermediate its ends, said clip spanning the split portion of the eye cup, a headed pin on one side of the split portion movably securing said clip to the eye cup, a second pin on the other side of the split portion adapted to interlock with the clip to lock the lens in the eye cup, said clip having its ends engaging the adjacent walls of the eye cup and its intermediate portion arched and spaced from the adjacent walls of the eye cup whereby the split edges of the eye cup will be urged together through the resiliency of the clip.

2. In a device of the character described, a split eye cup having means to engage a lens, a resilient locking clip spanning the split in the eye cup, means for movably securing one end of said clip to the eye cup and means for interlocking the other end of the clip to the eye cup, said clip having its end portions engaging the adjacent walls of the eye cup and its intermediate portion arched and spaced from the adjacent walls of the eye cup whereby the split edges of the eye cup will be urged together by the resiliency of the clip.

3. In a device of the character described, a split eye cup having means for holding a lens and pivotally movable means for locking the split eye cup to hold a lens in place therein, said pivotally movable means having its end portions engaging the adjacent walls of the eye cup and having its intermediate portion arched and spaced from the adjacent walls of the eye cup whereby the edges of the split of the cup may be urged together through the resiliency of said movable means.

NELSON M. BAKER.